United States Patent
Liu et al.

(10) Patent No.: US 9,355,244 B2
(45) Date of Patent: May 31, 2016

(54) SYSTEMS AND METHODS FOR PASSWORD RESET

(71) Applicant: Tencent Technology (Shenzhen) Company Limited, Shenzhen (CN)

(72) Inventors: Tiehua Liu, Shenzhen (CN); Zhigang Song, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/591,159

(22) Filed: Jan. 7, 2015

(65) Prior Publication Data

US 2015/0178493 A1    Jun. 25, 2015

Related U.S. Application Data

(63) Continuation of application No. PCT/CN2014/080079, filed on Jun. 17, 2014.

(30) Foreign Application Priority Data

Dec. 24, 2013  (CN) .......................... 2013 1 0724220

(51) Int. Cl.
*G06F 21/45*    (2013.01)
*H04L 29/06*    (2006.01)

(52) U.S. Cl.
CPC .............. *G06F 21/45* (2013.01); *H04L 63/083* (2013.01); *H04L 63/0884* (2013.01)

(58) Field of Classification Search
None
See application file for complete search history.

(56) References Cited

U.S. PATENT DOCUMENTS 7,353,536 B1    4/2008   Morris et al.
8,453,222 B1    5/2013   Newstadt et al.
8,844,003 B1 *  9/2014   Jakobsson ............. G06F 21/552
                                                              713/182

(Continued)

FOREIGN PATENT DOCUMENTS

CN    102130918 A    7/2011
CN    101981581 B    8/2013

(Continued)

OTHER PUBLICATIONS

Patent Cooperation Treaty, The International Search Report and the Written Opinion of the International Searching Authority, mailed Sep. 5, 2014, in PCT/CN2014/080079.

(Continued)

*Primary Examiner* — Michael R Vaughan
(74) *Attorney, Agent, or Firm* — Jones Day

(57) ABSTRACT

Systems and methods are provided for password reset. For example, a first server receives a request operation instruction from a user terminal, wherein the request operation instruction includes account information and identity information; the first server determines whether to permit password reset for a first account indicated by the account information; in response to the password reset for the first account being permitted, the first server authenticates the account information and the identity information; if the authentication of the account information and the identity information is successful, the first server processes the request operation instruction and sends a password reset prompt to the user terminal; the user terminal receives the password reset prompt and sends to the first server password information set by a user in response to the password reset prompt; and the first server sends to a second server a password reset request that carries the password information.

7 Claims, 11 Drawing Sheets

(56) References Cited

U.S. PATENT DOCUMENTS

| | | |
|---|---|---|
| 2002/0065913 A1 | 5/2002 | Harrington |
| 2002/0147914 A1* | 10/2002 | Arnold .................... G06F 21/32 713/186 |
| 2006/0059362 A1* | 3/2006 | Paden .................. H04L 63/083 713/184 |
| 2006/0095785 A1* | 5/2006 | White .................. G06F 21/305 713/184 |
| 2007/0143831 A1* | 6/2007 | Pearson ................. H04L 63/08 726/5 |
| 2007/0226791 A1* | 9/2007 | Charbonneau .......... G06F 21/41 726/18 |
| 2008/0046982 A1 | 2/2008 | Parkinson |
| 2012/0084844 A1* | 4/2012 | Brown .................... G06F 21/34 726/6 |
| 2015/0072646 A1* | 3/2015 | Bravo ................... H04W 12/08 455/411 |

FOREIGN PATENT DOCUMENTS

| | | |
|---|---|---|
| CN | 103457991 A | 12/2013 |
| TW | 201117593 A | 5/2011 |
| WO | WO 2006/049716 A1 | 5/2006 |

OTHER PUBLICATIONS

Taiwan Patent Office, Office Action issued Oct. 5, 2015, in Application No. 103123570.

* cited by examiner

SYSTEMS AND METHODS FOR PASSWORD RESET

CROSS-REFERENCES TO RELATED APPLICATIONS

This application is a continuation of International Application No. PCT/CN2014/080079, with an international filing date of Jun. 17, 2014, now pending, which claims priority to Chinese Patent Application No. 201310724220.4, filed Dec. 24, 2013, both applications being incorporated by reference herein for all purposes.

BACKGROUND OF THE INVENTION

Certain embodiments of the present invention are directed to computer technology. More particularly, some embodiments of the invention provide systems and methods for network technology. Merely by way of example, some embodiments of the invention have been applied to password reset. But it would be recognized that the invention has a much broader range of applicability.

With the development of network technology, online payment becomes more and more extensively used. A critical stage of online payment is verification, such as password verification. Passwords are very important for online payment. However, a password can be easily leaked out, and a user has to reset the password and set a new password so as to improve the safety of online payment. The conventional technology for password reset often includes: sending a verification message to a cell phone associated with the user account and, upon receipt of a response message from the cell phone, beginning the password reset. In another example, an independent entry often needs to be provided for password reset. That is, no other services are available during the process of password reset. Thus, the password reset is often not very safe, and the efficiency of device processing is often low because no other services can be performed during password reset.

Hence it is highly desirable to improve the techniques for password reset.

BRIEF SUMMARY OF THE INVENTION

According to one embodiment, a method is provided for password reset. For example, a first server receives a request operation instruction from a user terminal, wherein the request operation instruction includes account information and identity information; the first server determines whether to permit password reset for a first account indicated by the account information; in response to the password reset for the first account being permitted, the first server authenticates the account information and the identity information; in response to the authentication of the account information and the identity information being successful, the first server processes the request operation instruction and sends a password reset prompt to the user terminal; the user terminal receives the password reset prompt and sends to the first server password information set by a user in response to the password reset prompt; the first server sends to a second server a password reset request that carries the password information; the second server responds to the password reset request; and the second server sets a new password for the first account according to the password information.

According to another embodiment, a method is provided for password reset. A request operation instruction is received from a user terminal, wherein the request operation instruction includes account information and identity information; whether to permit password reset for a first account indicated by the account information is determined; in response to the password reset for the first account being permitted, the account information and the identity information are authenticated; in response to the authentication of the account information and the identity information being successful, the request operation instruction is processed and a password reset prompt is sent to the user terminal; password information set by the user terminal is received, wherein the password information is set by a user in response to the password reset prompt after the user terminal receives the password reset prompt; and a password reset request that carries the password information is sent to a server so that the server responds to the password reset request and sets a new password for the first account according to the password information.

According to yet another embodiment, a system for password reset includes: a first server, a user terminal and a second server. The first server is configured to: receive a request operation instruction from the user terminal, wherein the request operation instruction includes account information and identity information; determine whether to permit password reset for a first account indicated by the account information; in response to the password reset for the first account being permitted, authenticate the account information and the identity information; in response to the authentication of the account information and the identity information being successful, process the request operation instruction and send a password reset prompt to the user terminal; the user terminal is configured to receive the password reset prompt and send to the first server password information set by a user in response to the password reset prompt; the first server is further configured to send to the second server a password reset request that carries the password information; and the second server is configured to respond to the password reset request and set a new password for the first account according to the password information.

In one embodiment, a device for password reset includes: a first receiving unit; a determining unit; a first authenticating unit; a first processing unit; a first sending unit; a second receiving unit; and a second sending unit. The first receiving unit is configured to receive a request operation instruction from the user terminal, wherein the request operation instruction includes account information and identity information. The determining unit is configured to determine whether to permit password reset for a first account indicated by the account information. The first authenticating unit is configured to, in response to the password reset for the first account being permitted, authenticate the account information and the identity information. The first processing unit is configured to in response to the authentication of the account information and the identity information being successful, process the request operation instruction. The first sending unit is configured to send a password reset prompt to the user terminal. The second receiving unit is configured to receive password information set by the user terminal, wherein the password information is set by a user in response to the password reset prompt after the user terminal receives the password reset prompt. The second sending unit is configured to send to a server a password reset request that carries the password information so that the server responds to the password reset request and sets a new password for the first account according to the password information.

In another embodiment, a non-transitory computer readable storage medium includes programming instructions for password reset. The programming instructions are configured to cause one or more data processors to execute certain operations. For example, a request operation instruction is received from a user terminal, wherein the request operation instruction includes account information and identity information; whether to permit password reset for a first account indicated by the account information is determined; in response to the password reset for the first account being permitted, the account information and the identity information are authenticated; in response to the authentication of the account information and the identity information being successful, the request operation instruction is processed and a password reset prompt is sent to the user terminal; password information set by the user terminal is received, wherein the password information is set by a user in response to the password reset prompt after the user terminal receives the password reset prompt; and a password reset request that carries the password information is sent to a server so that the server responds to the password reset request and sets a new password for the first account according to the password information.

For example, the devices, systems and methods disclosed herein are configured to perform password reset according to identity information so as to improve the safety of password reset. As an example, the devices, systems and methods disclosed herein are configured to perform password reset during processing of a request operation instruction (i.e. the password reset and the processing of request operation instructions being combined in a single process), hence increasing the efficiency of service processing.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
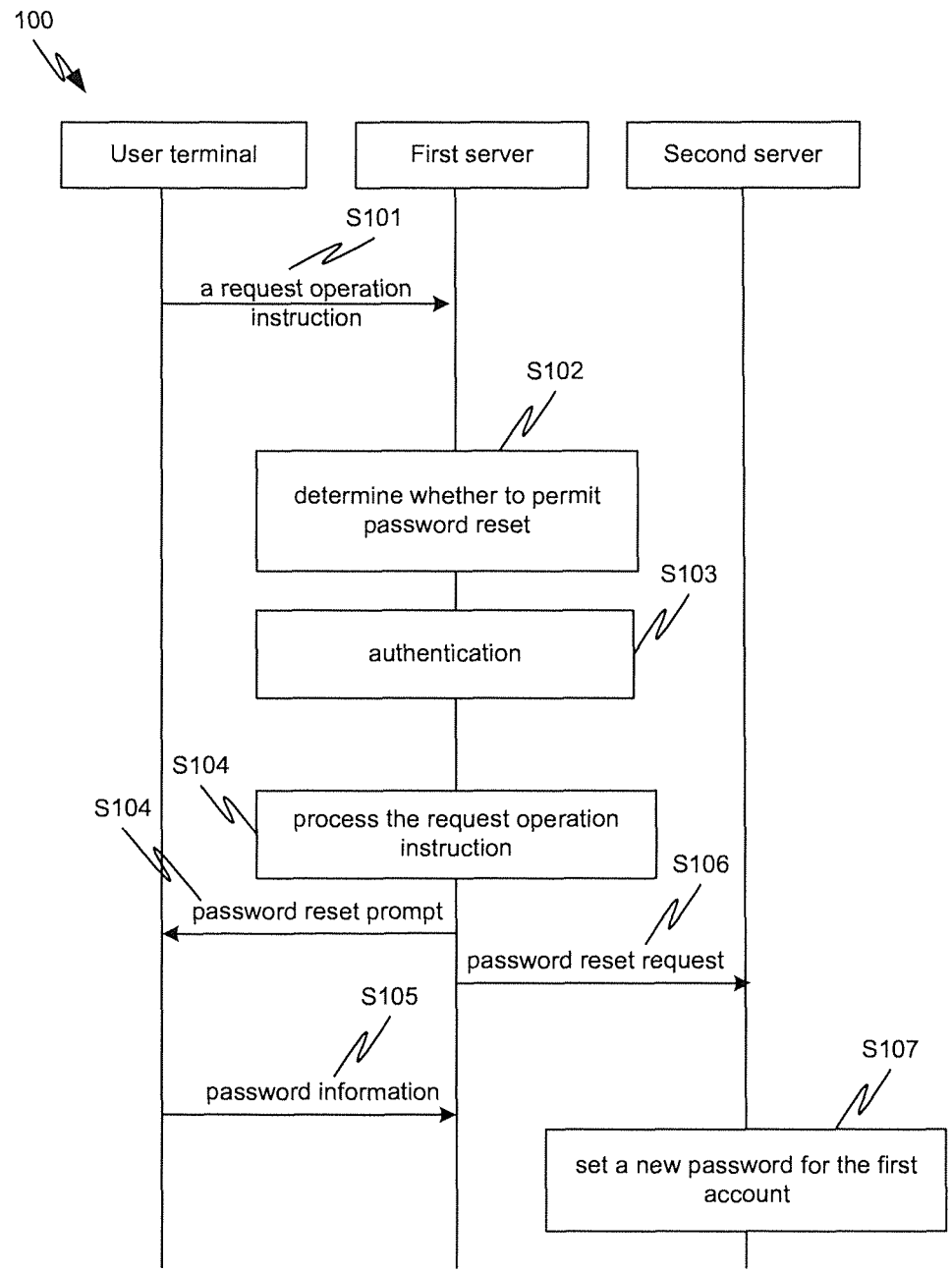
FIG. 1 is a simplified diagram showing a method for password reset according to one embodiment of the present invention.

FIG. 1 is a simplified diagram showing a method for password reset according to one embodiment of the present invention. The diagram is merely an example, which should not unduly limit the scope of the claims. One of ordinary skill in the art would recognize many variations, alternatives, and modifications. The method 100 includes at least processes S101-S107.

According to one embodiment, during the process S101, a first server receiving a request operation instruction from a user terminal, wherein the request operation instruction includes account information and identity information. For example, during the process S101, the user terminal logs onto a webpage provided by the first server and inputs the request operation instruction on the webpage so that the first server receives the request operation instruction. As an example, the identity information is recorded upon registration of a first account as indicated by the account information. That is, the identity information is understood as the identity information associated with the first account, e.g., an ID card number, address information, age information and family information, etc.

According to another embodiment, during the process S102, the first server determines whether to permit password reset for the first account indicated by the account information. For example, in response to the password reset for the first account being permitted, the process S103 is executed. In another example, in response to the password reset for the first account not being permitted, the execution of the method 100 ends. In some embodiments, the first server allows password reset for the first account if the first account satisfies a preset condition. For example, the account information has a high level of safety. In another example, the account information indicates a low balance. In yet another example, the goods corresponding to the request operation instruction have been received.

According to yet another embodiment, during the process S103, the first server authenticates the account information and the identity information. For example, the authentication includes judging if the account information and the identity information are associated together. If the account information and the identity information are associated together, the authentication is successful. Otherwise, the authentication fails. As an example, in response to the authentication failing, the execution of the method 100 ends.

In one embodiment, during the process S104, the first server processes the request operation instruction and sends a password reset prompt to the user terminal when the authentication is successful. For example, as identity information can hardly be stolen, the first server can confirm that the account information is safe according to the identity information when the authentication is successful. Thus, the first server can process the request operation instruction, according to certain embodiments. As an example, as the account password is not required to process the request operation instruction, the request operation instruction can still be processed even if the user loses the password. For example, when the request operation instruction is used to request for payment, the payment can be completed without the need to input the account password. In another example, the first server sends to the user terminal a webpage for password setup, hence allowing the user to set the password on the webpage via the user terminal. In yet another example, the first server sends to the user terminal a message that requests to return password information, hence allowing the user to return the password information to the first server via the user terminal when the user sees the message.

In another embodiment, during the process S105, the user terminal receives the password reset prompt and sends, to the first server, password information set by a user in response to the password reset prompt. For example, once receiving the password reset prompt, the user terminal can display the password reset prompt so that the user can set the password on the user terminal and the user terminal can send the password information to the first server. In another example, the password information includes a password or a password rule.

In yet another embodiment, during the process S106, the first server sends to a second server a password reset request that carries the password information. For example, once receiving the password information, the first server can send to the second server the password reset request so as to request the second server to reset the password of the first account. In another example, the password reset request includes the account information and/or the identity information.

In yet another embodiment, during the process S107, the second server responds to the password reset request and sets a new password for the account according to the password information. For example, the second server sets the password information as the new password of the account. In another example, the second server generates a new password for the account according to the password information.

Figure 2:
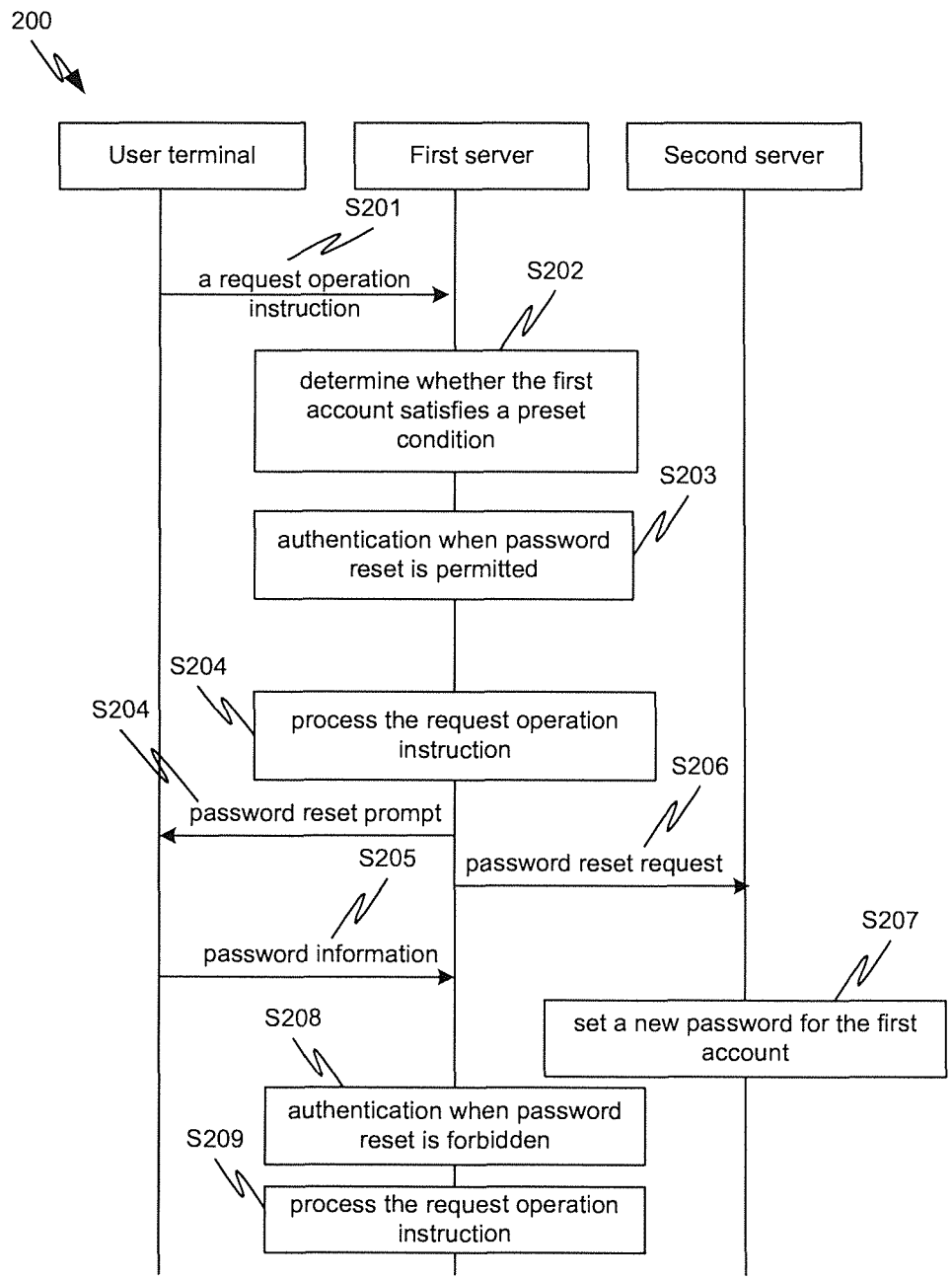
FIG. 2 is a simplified diagram showing a method for password reset according to another embodiment of the present invention.

FIG. 2 is a simplified diagram showing a method for password reset according to another embodiment of the present invention. The diagram is merely an example, which should not unduly limit the scope of the claims. One of ordinary skill in the art would recognize many variations, alternatives, and modifications. The method 200 includes at least processes S201-S209.

According to one embodiment, during the process S201, a first server receives a request operation instruction from a user terminal, wherein the request operation instruction includes account information and identity information. For example, during the process S202, the first server determines whether a first account indicated by the account information satisfies a preset condition. As an example, if the first account indicated by the account information satisfies a preset condition, the password reset for the first account is permitted and the process S203 is executed. As another example, if the first account indicated by the account information does not satisfy the preset condition, the password reset for the first account is forbidden, and the process S208 is executed. In some embodiments, the preset condition is flexibly set by the first server. For example, the preset condition includes a balance being less than a specific amount. In another example, the preset condition includes a safety level being higher than a specific safety level. In yet another example, the preset condition includes the goods corresponding to the request operation instruction being received. In yet another example, the preset condition includes limited losses from theft of a password. In certain embodiments, when the password reset for the first account is permitted, the first server generates a mark indicating that password reset for the first account is permitted so that the subsequent process of password reset can recognize via the mark that password reset for the first account is permitted.

According to another embodiment, during the process S203, the first server authenticates the account information and the identity information. For example, during the process S203, the first server sends an authentication request to the second server, wherein the authentication request includes the account information and the identity information. For example, the second server authenticates the association between the account information and the identity information and sends an authentication pass message to the first server when the authentication is successful. In another example, the first server receives the authentication pass message from the second server. In yet another example, the second server includes a server that manages the password of the account indicated by the account information and therefore the second server can save the identity information, such as the identity information associated with the account information. In some embodiments, when the second server receives the account information and the identity information sent by the first server, the second server can authenticate the associations. For example, the second server authenticates if the account information and the identity information sent by the first server are associated. If the account information and the identity information sent by the first server are associated, the authentication is successful. Otherwise, the authentication fails. In another example, the second server determines if the identity information sent by the first server conforms to a pre-stored identity information that is associated with the account information. If the identity information sent by the first server conforms to the pre-stored identity information, the authentication is successful. Otherwise, the authentication fails.

According to yet another embodiment, during the process S204, the first server processes the request operation instruction and sends a password reset prompt to the user terminal when the authentication is successful. For example, if the first server receives the authentication pass message, the account indicated by the account information is safe and the first server can process the request operation instruction. In another example, if the first server receives the authentication failure message, the account indicated by the account information is unsafe and the first server may not process the request operation instruction. As an example, the first server sends to a designated communication account a verification request that requests to return verification information, wherein the communication account is associated with the first account. As another example, the first server receives the verification information returned by the communication account and processes the request operation instruction according to the verification information. As yet another example, once the first server receives the authentication pass message, the authentication of the account information and the identity information is successful.

In some embodiments, further verification is performed via the communication account in order to improve the safety of payment. For example, the communication account includes a cell phone, an email address and/or an instant messaging account. In another example, the first server acquires the communication account in advance or receive the communication account transmitted by the user terminal. In yet another example, the verification information includes text information, image information or audio information.

In another embodiment, during the process S205, the user terminal receives the password reset prompt and sends, to the first server, password information set by a user in response to the password reset prompt. For example, during the process S206, the first server sends to a second server a password reset request that carries the password information. In another example, during the process S207, the second server responds to the password reset request and sets a new password for the account according to the password information. As an example, the password reset request includes the account information and/or the identity information. As another example, the first server generates a password reset credential according to the account information and the identity information. Then the first server sends the password reset credential to the second server via the password reset request. For example, the first server combines the account information and the identity information into the password reset credential. In another example, the first server generates the password reset credential through specific computation of the account information and the identity information. The second server can acquire the account information and the identity information via the password reset credential, hence completing the password reset of the account, according to some embodiments. For example, the method 200 may further include: the first server generates a password reset credential according to the account information and the identity information.

In yet another embodiment, during the process S206, the first server sends to the second server a password reset request, wherein the password reset request includes the password information and the password reset credential. For example, during the process S207, the second server responds to the password reset request and sets a new password for the first account according to the password reset credential and the password information. The safety of account password is improved as the second server needs to pass the password reset credential before the password of the account indicated by the account information can be reset, according to certain embodiments.

According to one embodiment, during the process S208, the first server authenticates the account information and the identity information if password reset for the first account is forbidden. For example, during the process S209, the first server processes the request operation instruction when the authentication is successful. Through the processes S208 and S209, the first server can authenticate the account information and the identity information when password reset for the first account is forbidden, and then if the authentication is successful, the request operation instruction is processed, according to some embodiments. This enables processing of a request operation instruction even when password reset is forbidden, hence avoiding cancellation of processing of the request operation instruction when password reset is forbidden, in some embodiments.

According to another embodiment, during the process S208, if the password reset for the account is forbidden, the first server sends an authentication request to the second server, wherein the authentication request includes the account information and the identity information. For example, the second server authenticates the association between the account information and the identity information and sends an authentication pass message to the first server when the authentication is successful. In another example, the first server receives the authentication pass message from the second server. As the request operation instruction can be processed after verification is successful, the safety of processing of the request operation instruction can be improved, and the safety of payment can be improved, according to certain embodiments.

According to yet another embodiment, during the process S209, when the authentication is successful, the first server sends to a designated communication account a verification request that requests to return verification information, wherein the communication account is associated with the account. For example, the first server receives the verification information returned by the communication account and processes the request operation instruction according to the verification information. The communication account is further verified after authentication of account information and identity information is successful, hence improving the safety of processing of the request operation instruction and improving the safety of payment, according to some embodiments.

In one embodiment, during the process S208, the first server authenticates the account information and the identity information if password reset for the first account is forbidden and the amount of payment requested by the request operation instruction does not exceed a preset threshold. For example, the first server authenticates the account information and the identity information when the amount of payment requested by the request operation instruction does not exceed a preset threshold. That is, the request operation instruction can be processed when the amount of payment requested by the request operation instruction does not exceed the preset threshold, so as to improve the safety of payment because only payments of small amount may be permitted when password reset for the account is forbidden, in some embodiments.

In certain embodiments, the request operation instruction is processed and the password is reset when the password reset is permitted. For example, when the password reset is forbidden, the request operation instruction is processed but the password is not reset. It improves the safety of processing of request operation instructions and the efficiency of service processing of devices, according to certain embodiments.

Figure 3:
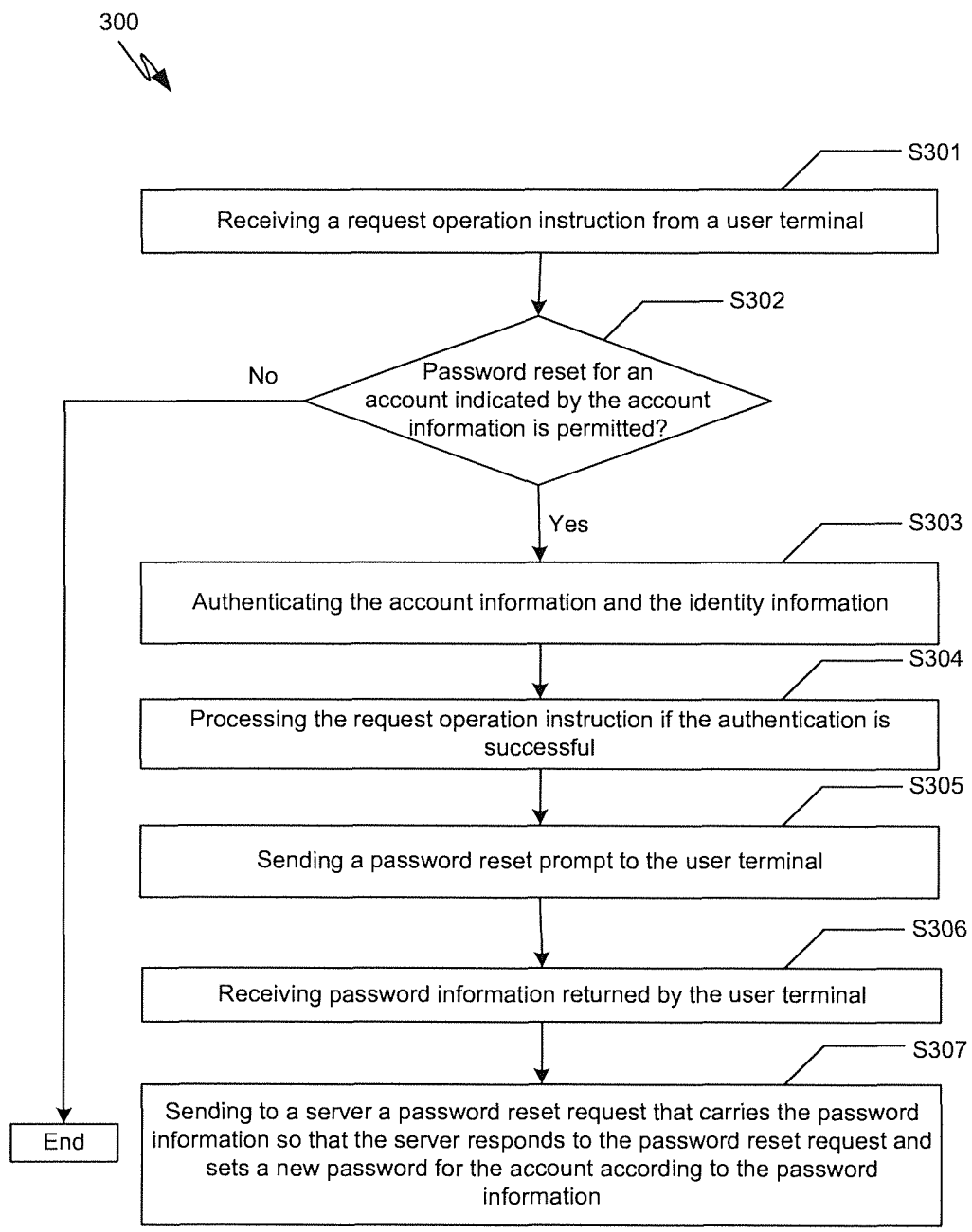
FIG. 3 is a simplified diagram showing a method for password reset according to yet another embodiment of the present invention.

FIG. 3 is a simplified diagram showing a method for password reset according to yet another embodiment of the present invention. The diagram is merely an example, which should not unduly limit the scope of the claims. One of ordinary skill in the art would recognize many variations, alternatives, and modifications. The method 300 includes at least processes S301-S307.

According to one embodiment, the process S301 includes: receiving a request operation instruction from a user terminal, wherein the request operation instruction includes account information and identity information. For example, the identity information includes information recorded upon registration of the account as indicated by the account information, e.g., an ID card number, address information, age information and family information. As an example, the process S302 includes: determining whether to permit password reset for a first account indicated by the account information. As another example, if the password reset for the first account is permitted, the process S303 is executed. As another example, if the password reset for the first account is not permitted, the execution of the method 300 ends.

According to another embodiment, the process S303 includes: authenticating the account information and the identity information if password reset for the account is permitted. For example, if the account satisfies a preset condition, the password reset for the account is permitted. As an example, the account has a high level of safety. As another example, the account bears a low balance. As yet another example, the goods corresponding to the request operation instruction have been received. In some embodiments, the process S304 includes processing the request operation instruction when the authentication is successful. For example, as identity information is not easy to be stolen, the account can be confirmed as safe according to the identity information when the authentication is successful in the process S304. Then the request operation instruction can be processed. As the account password is not required to process the request operation instruction, the request operation instruction can still be processed even when the user loses the password, according to some embodiments.

According to yet another embodiment, the process S305 includes sending a password reset prompt to the user terminal. For example, a webpage for setup of password is sent to the user terminal, hence allowing the user to set the password on the webpage via the user terminal. In another example, a message that requests to return password information is sent to the user terminal, hence allowing the user to return the password information via the user terminal when the user sees the message. As an example, the process S306 includes: receiving password information returned by the user terminal, where the password information is set by a user in response to the password reset prompt after the user terminal receives the password reset prompt. As another example, once receiving the password reset prompt, the user terminal can display the password reset prompt so that the user can set the password on the user terminal and the user terminal can return the password information. As yet another example, the password information includes a password or a password rule.

In one embodiment, the process S307 includes: sending to a server a password reset request that carries the password information so that the server responds to the password reset request and sets a new password for the account according to the password information. For example, once the password information is received in the process S306, the password reset request can be sent to the server so as to request the server to reset the password of the account. In another example, the password reset request includes the account information and/or the identity information.

Figure 4:
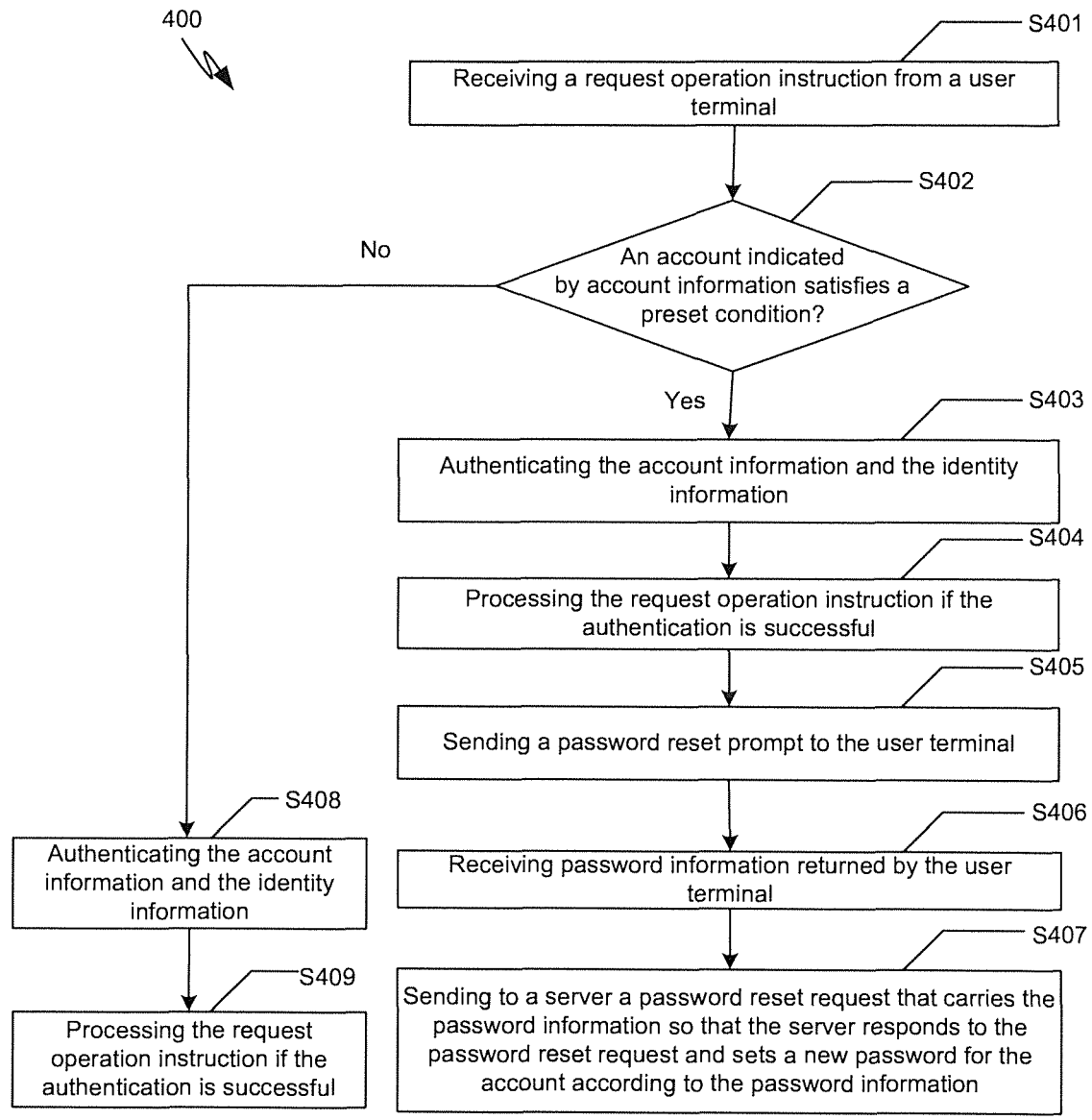
FIG. 4 is a simplified diagram showing a method for password reset according to yet another embodiment of the present invention.

FIG. 4 is a simplified diagram showing a method for password reset according to yet another embodiment of the present invention. The diagram is merely an example, which should not unduly limit the scope of the claims. One of ordinary skill in the art would recognize many variations, alternatives, and modifications. The method 400 includes at least processes S401-S409.

According to one embodiment, the process S401 includes: receiving a request operation instruction from a user terminal, where the request operation instruction includes account information and identity information. For example, the process S402 includes: determining whether the account indicated by the account information satisfies a preset condition. If the account indicated by the account information satisfies the preset condition, password reset for the account is permitted, and the process S403 is executed. Otherwise, the password reset for the account is forbidden and the process S408 is executed. The preset condition is flexibly set. For example, the preset condition includes the balance being less than a specific amount. In another example, the preset condition includes the safety level being higher than a specific safety level. In yet another example, the preset condition includes the goods corresponding to the request operation instruction being received. In yet another example, the preset condition includes limited losses from theft of the password. In some embodiments, when password reset for the account is permitted, a mark indicating that password reset for the account information is permitted is generated so that the subsequent process of password reset can recognize via the mark that password reset for this account is permitted.

According to another embodiment, the process S403 includes authenticating the account information and the identity information. For example, the process S403 includes: sending an authentication request to the server, where the authentication request includes the account information and the identity information, so that the server authenticates the association between the account information and the identity information, and receiving an authentication pass message from the server. As an example, the server manages the password of the account indicated by the account information and therefore the server can save the identity information, such as the identity information associated with the account information. In some embodiments, when the server receives the account information and the identity information, it can authenticate the associations. For example, the server can authenticate if the account information and the identity information received are associated. If the account information and the identity information are associated, the authentication is successful, and if the account information and the identity information are not associated, the authentication fails, according to certain embodiments. For example, the server can judge if the identity information received conforms to the pre-stored identity information that is associated with the account information. If the identity information conforms to the pre-stored identity information, the authentication is successful. Otherwise, the authentication fails. If the authentication is successful, the account is safe and the request operation instruction can be processed. If the authentication fails, the account is unsafe and the method may refuse to process the request operation instruction, according to some embodiments.

According to yet another embodiment, the process S404 includes processing the request operation instruction when the authentication is successful. For example, a verification request that requests to return verification information is sent to a designated communication account, where the communication account is associated with the account. In another example, the verification information returned by the communication account is received, and the request operation instruction is processed according to the verification information. In yet another example, once the authentication is successful, verification can be performed via the designated communication account in the process S404 in order to improve the safety of payment. In yet another example, the communication account includes a cell phone number, an email address and an instant messaging account. In yet another example, a device that performs the method 400 acquires the communication account in advance or receive the communication account transmitted by the user terminal.

In one embodiment, the process S405 includes sending a password reset prompt to the user terminal. For example, the process S406 includes receiving password information returned by the user terminal, where the password information is set by a user in response to the password reset prompt after the user terminal receives the password reset prompt. In another example, the process S407 includes sending to the server a password reset request that carries the password information so that the server responds to the password reset request and sets a new password for the account according to the password information. In yet another example, the password reset request includes the account information and/or the identity information. In yet another example, a password reset credential is generated according to the account information and the identity information, and then the password reset credential is sent to the server via the password reset request. As an example, the account information and the identity information are combined into a password reset credential. As another example, the password reset credential is generated through specific computation of the account information and the identity information. The server can acquire the account information and the identity information via the password reset credential, hence completing the password reset of the account, in some embodiments. For example, the method 400 further includes: generating a password reset credential according to the account information and the identity information.

In another embodiment, the process S407 includes: sending to the server a password reset request, where the password reset request includes the password information and the password reset credential, so that the server sets a new password for the account according to the password reset credential and the password information. The safety of payment password is improved as the server needs to authenticate the password reset credential before the password of the account can be reset, according to certain embodiments. For example, the process S408 includes: authenticating the account information and the identity information if password reset for the account is permitted. In another example, the process S409 includes: processing the request operation instruction when the authentication is successful. As an example, through the processes S408 and S409, the request operation instruction can be processed according to the account information and the identity information when the password reset for the account is forbidden. This enables processing of a request operation instruction even when password reset is forbidden, hence avoiding cancellation of processing of the request operation instruction when password reset is forbidden, in some embodiments.

In yet another embodiment, the process S408 includes: sending an authentication request to the server when password reset for the account is forbidden, where the authentication request includes the account information and the identity information, so that the server authenticates the association between the account information and the identity information. For example, the process S408 further includes: receiving an authentication pass message from the server. As the request operation instruction can be processed after verification is successful, the safety of processing of the request operation instruction is hence improved, according to certain embodiments. For example, the process S409 includes: sending to a designated communication account the verification request that requests to return verification information, where the communication account is associated with the account, receiving the verification information returned by the communication account and processing the request operation instruction according to the verification information. The communication account is further verified after the authentication of the account information and the identity information is successful, hence improving the safety of processing of the request operation instruction, according to certain embodiments.

According to one embodiment, the process S408 includes: authenticating the account information and the identity information if password reset for the account is forbidden and the amount of payment requested by the request operation instruction does not exceed a preset threshold. For example, the account information and the identity information are authenticated when the amount of payment requested by the request operation instruction does not exceed a preset threshold. That is, the request operation instruction can be processed when the amount of payment requested by the request operation instruction does not exceed the preset threshold. This improves the safety of payment because only payment of small amount is permitted when password reset for the account is forbidden, according to some embodiments.

Figure 5:
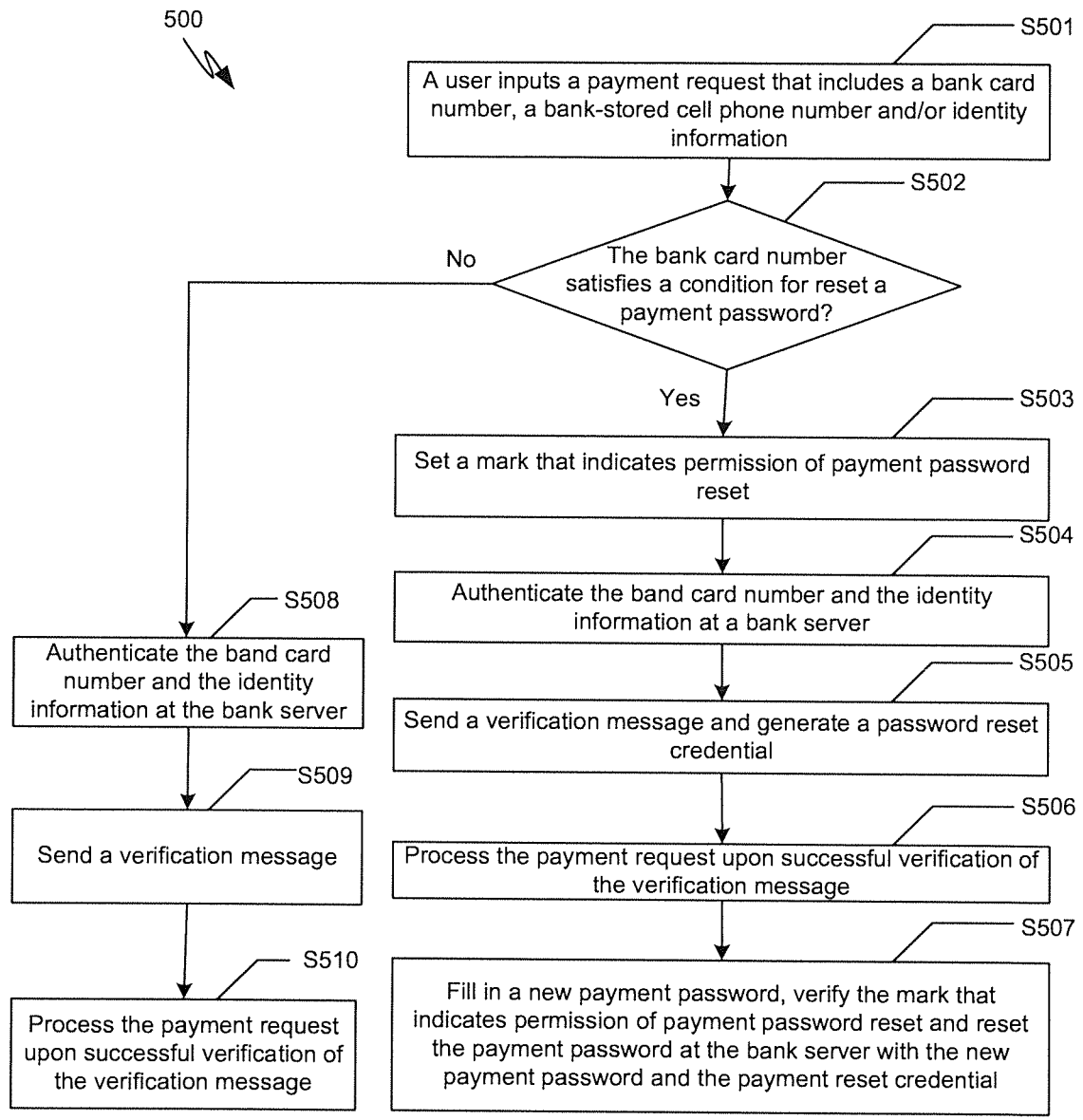
FIG. 5 is a simplified diagram showing a method for password reset according to yet another embodiment of the present invention.

FIG. 5 is a simplified diagram showing a method for password reset according to yet another embodiment of the present invention. The diagram is merely an example, which should not unduly limit the scope of the claims. One of ordinary skill in the art would recognize many variations, alternatives, and modifications. The method 500 includes at least processes S501-S510.

According to one embodiment, during the process S501, a user inputs a payment request that includes a bank card number, a bank-stored cell phone number and identity information. For example, a user terminal inputs the bank card number, the bank-stored cell phone number and the identity information on a payment website, as shown in FIG. 6(A).

Figures 6A, 6B:
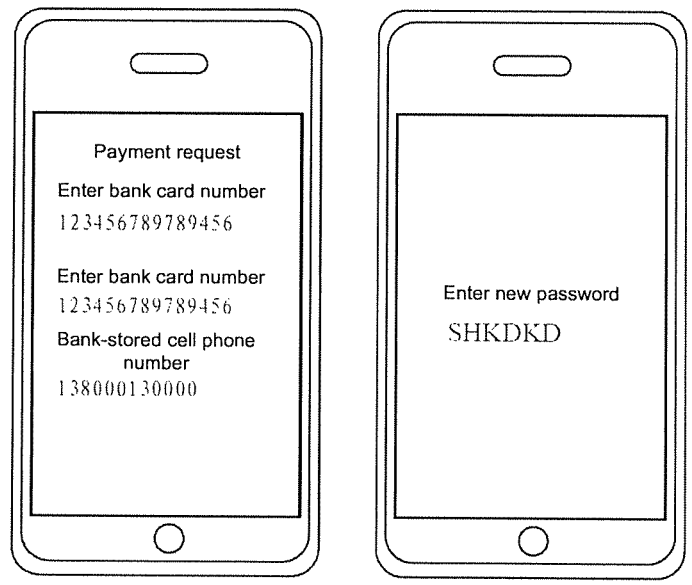
FIG. 6(A) and FIG. 6(B) are simplified diagrams showing user interfaces for receiving user inputs according to some embodiments of the present invention.

FIG. 6(A) and FIG. 6(B) are simplified diagrams showing user interfaces for receiving user inputs according to some embodiments of the present invention. The diagrams are merely examples, which should not unduly limit the scope of the claims. One of ordinary skill in the art would recognize many variations, alternatives, and modifications.

Referring back to FIG. 5, the user terminal displays the payment website, receives user operations for inputting the bank card number, the bank-stored cell phone number and the identity information, according to some embodiments. For example, the process S502 includes: determining whether the bank card number satisfies a condition for payment password reset. If the bank card number satisfies the condition, the process S503 is executed. Otherwise, the process S508 is executed. As an example, the payment website (e.g. the first server) determines if the bank card number satisfies the condition for payment password reset, where the condition for payment password reset includes the preset condition described above.

According to another embodiment, the process S503 includes: setting a mark that indicates permission of payment password reset (e.g., indicating that password reset is permitted for the bank card number). For example, the process S504 includes: authenticating the bank card number and the identity information at the bank server. The payment website sends the bank card number and the identity information to the bank server for authentication, in some embodiments. For example, the process S505 includes: sending a verification message and generating a password reset credential. As an example, the verification message is sent to the bank-stored cell phone number after authentication is successful. As another example, the payment website generates the payment password reset credential according to the bank card number and the identity information.

According to yet another embodiment, the process S506 includes: processing the payment request upon successful verification of the verification message. For example, the process S507 includes: filling in a new payment password, verifying the mark that indicates permission of payment password reset and resetting the payment password at the bank server with the new payment password and the payment reset credential. As an example, the user terminal displays the webpage for fill-in of the new password, as shown in FIG. 6(B). As another example, the user terminal receives the new payment password that the user inputs on the webpage, and the payment website receives the new payment password, verifies the mark that indicates permission of payment password reset and resets the payment password at the bank server with the new payment pass and the payment reset credential.

In one embodiment, the process S508 includes: authenticating the bank card number and the identity information at the bank server. For example, the payment website sends the bank card number and the identity information to the bank server for authentication. In another example, the process S509 includes: sending a verification message. As an example, a verification message is sent to the bank-stored cell phone number after authentication is successful. In yet another example, the process S510 includes: processing the payment request upon successful verification of the verification message.

Figure 7:
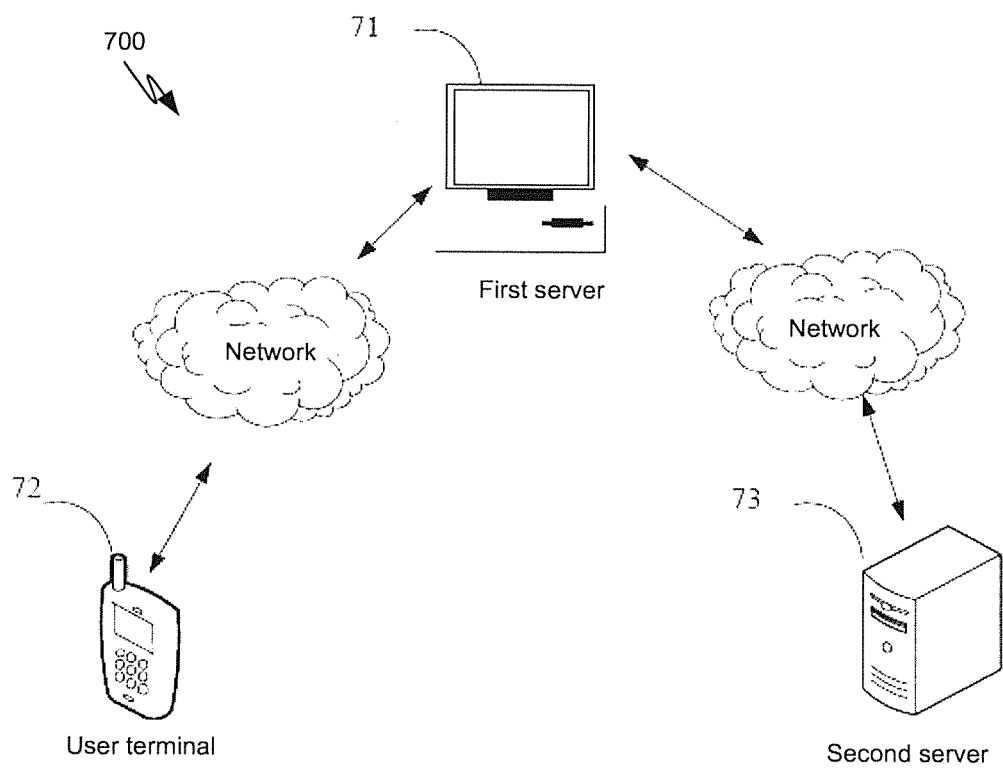
FIG. 7 is a simplified diagram showing a system for password reset according to one embodiment of the present invention.

FIG. 7 is a simplified diagram showing a system for password reset according to one embodiment of the present invention. The diagram is merely an example, which should not unduly limit the scope of the claims. One of ordinary skill in the art would recognize many variations, alternatives, and modifications. The system 700 includes a first server 71, a user terminal 72 and a second server 73.

According to one embodiment, the first server 71 is configured to receive a request operation instruction from the user terminal 72, where the request operation instruction includes account information and identity information. For example, the user terminal 72 logs onto the webpage provided by the first server 71 and inputs the request operation instruction on the payment webpage so that the first server 71 receives the request operation instruction. In another example, the identity information is recorded upon registration of the account as indicated by the account information. As an example, the identity information is associated with the account, such as an ID card number, address information, age information and family information.

According to another embodiment, the first server 71 is further configured to determine whether to permit password reset for an account indicated by the account information. For example, the first server 71 allows password reset for the account if the account satisfies the preset condition, e.g., the account information having a high level of safety, the account information indicating a low balance, or the goods corresponding to the request operation instruction being received. In another example, the first server 71 is further configured to authenticate the account information and the identity information if password reset for the account is permitted, and process the request operation instruction and send a password reset prompt to the user terminal 72 when the authentication is successful. In yet another example, as the identity information can hardly be stolen, the first server 71 can confirm that the account information is safe according to the identity information when the authentication is successful, and process the request operation instruction. As the account password is not required to process the request operation instruction, the request operation instruction can still be processed even when the user loses the password, according to certain embodiments. For example, when the request operation instruction is used to request for payment, the payment can be completed without the need to input the account password. In another example, the first server 71 sends a webpage for setup of password to the user terminal 72, hence allowing the user to set the password on the webpage via the user terminal 72. In yet another example, the first server 71 sends a message that requests to return password information to the user terminal 72, hence allowing the user to return the password information to the first server 71 via the user terminal 72 when the user sees the message.

According to yet another embodiment, the user terminal 72 is configured to receive the password reset prompt and send, to the first server 71, password information set by a user in response to the password reset prompt. For example, once receiving the password reset prompt, the user terminal 72 can display the password reset prompt so that the user can set the password on the user terminal 72 and the user terminal 72 can send the password information to the first server 71. In another example, the password information includes a password or a password rule. In yet another example, the first server 71 is further configured to send to the second server 73 a password reset request that carries the password information. As an example, once receiving the password information, the first server 71 can send to the second server 73 the password reset request so as to request the second server 73 to reset the password of the account. As another example, the password reset request includes the account information and/or the identity information.

In one embodiment, the second server 73 is configured to respond to the password reset request and set a new password for the account according to the password information. For example, the second server 73 may set the password information as the new password of the account, or generate a new password for the account according to the password information. In another example, the first server 71 is further configured to authenticate the account information and the identity information if password reset for the account is forbidden, and process the request operation instruction when the authentication is successful. This enables processing of a request operation instruction even when password reset is forbidden, hence avoiding cancellation of processing of the request operation instruction when password reset is forbidden, according to certain embodiments.

In another embodiment, the first server 71 is further configured to send an authentication request to the second server 73, where the authentication request includes the account information and the identity information. For example, the second server 73 is further configured to authenticate the association between the account information and the identity information and send an authentication pass message to the first server 71 when the authentication is successful. In another example, the first server 71 is further configured to receive the authentication pass message.

In yet another embodiment, the second server 73 manages the password of the account indicated by the account information and therefore the second server 73 can save the identity information, such as the identity information associated with the account information. For example, when the second server 73 receives the account information and the identity information sent by the first server 71, the second server 73 can authenticate the associations. In another example, the second server 73 can authenticate if the account information and the identity information sent by the first server 71 are associated. If the account information and the identity information are associated, the authentication is successful. Otherwise, the authentication fails. In yet another example, the second server 73 determines if the identity information sent by the first server 71 conforms to the pre-stored identity information that is associated with the account information. If the identity information conforms to the pre-stored identity information, the authentication is successful. Otherwise, the authentication fails. In yet another example, if the first server 71 receives the authentication pass message, the account information is safe and the first server 71 can process the request operation instruction. In yet another example, if the first server 71 receives the authentication failure message, the account information is unsafe and the first server 71 may not process the request operation instruction.

According to one embodiment, the first server 71 is further configured to send to a designated communication account verification request that requests to return verification information, where the communication account is associated with the account. For example, the first server 71 is further configured to receive the verification information returned by the communication account and process the request operation instruction according to the verification information. Once the first server 71 receives the authentication pass message, that authentication of the account information and the identity information is successful. Further verification is performed via the communication account in order to improve the safety of payment, according to some embodiments. For example, the communication account includes a cell phone number, an email address and an instant messaging account. In another example, the first server 71 may acquire the communication account in advance or receive the communication account transmitted by the user terminal 72. In yet another example, the verification information includes text information, image information or audio information.

According to another embodiment, the first server 71 generates a password reset credential according to the account information and the identity information. For example, then the first server 71 sends the password reset credential to the second server 73 via the password reset request. In another example, the account information and the identity information are combined into a password reset credential. In yet another example, the password reset credential is generated through specific computation of the account information and the identity information. The second server 73 can acquire the account information and the identity information via the password reset credential, hence completing the password reset of the account according to some embodiments. For example, the first server 71 is further configured to generate a password reset credential according to the account information and the identity information. In another example, the first server 71 is further configured to send to the second server 73 a password reset request, where the password reset request includes the password information and the password reset credential. In yet another example, the second server 73 is further configured to respond to the password reset request and set a new password for the account according to the password reset credential and the password information. The safety of account password is improved as the second server 73 needs to pass the password reset credential before the password of the account indicated by the account information can be reset, according to some embodiments.

According to yet another embodiment, if the account satisfies the preset condition, password reset for the account is allowed. The preset condition can be flexibly set by the first server 71. For example, the preset condition includes the balance being less than a specific amount, the safety level being higher than a specific safety level, the goods corresponding to the request operation instruction being received, or limited losses from theft of the password. In another example, when password reset for the account is permitted, the first server 71 may generate a mark indicating that password reset for the account is permitted so that the subsequent process of password reset can recognize via the mark that password reset for this account is permitted. In yet another example, the first server 71 is further configured to send an authentication request to the second server 73 when password reset for the account is forbidden, wherein the authentication request includes the account information and the identity information. In yet another example, the second server 73 authenticates the association between the account information and the identity information and sends an authentication pass message to the first server 71 when the authentication is successful. As an example, the first server 71 is further configured to receive the authentication pass message.

In one embodiment, the first server 71 is further configured to, when receiving the authentication pass message, send to a designated communication account verification request that requests to return verification information, where the communication account is associated with the account; and receive the verification information returned by the communication account and process the request operation instruction according to the verification information. For example, if password reset for the account is forbidden, the first server 71 is further configured to process the request operation instruction when the authentication of the account information and the identity information is successful and the amount of payment requested by the request operation instruction does not exceed a preset threshold.

The first server 71 authenticates the account information and the identity information when the amount of payment requested by the request operation instruction does not exceed a preset threshold, according to some embodiments. For example, the request operation instruction can be processed when the amount of payment requested by the request operation instruction does not exceed the preset threshold. This improves the safety of payment because only payment of small amount is permitted when password reset for the account is forbidden, in some embodiments.

Figure 8:
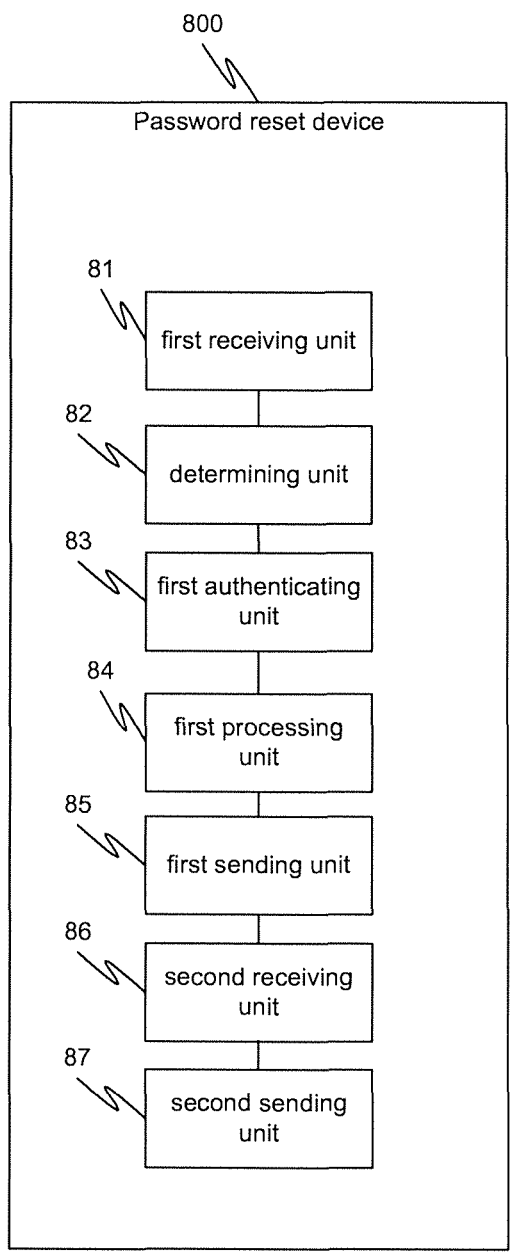
FIG. 8 is a simplified diagram showing a device for password reset according to one embodiment of the present invention.

FIG. 8 is a simplified diagram showing a device for password reset according to one embodiment of the present invention. The diagram is merely an example, which should not unduly limit the scope of the claims. One of ordinary skill in the art would recognize many variations, alternatives, and modifications. The device 800 includes a first receiving unit 81, a determining unit 82, a first authenticating unit 83, a first processing unit 84, a first sending unit 85, a second receiving unit 86 and a second sending unit 87.

According to one embodiment, the first receiving unit 81 is configured to receive a request operation instruction from a user terminal, where the request operation instruction includes account information and identity information. For example, the identity information is recorded upon registration of the account as indicated by the account information, e.g. an ID card number, address information, age information and family information. As an example, the determining unit 82 is configured to determine whether to permit password reset for an account indicated by the account information. As another example, the first authenticating unit 83 is configured to authenticate the account information and the identity information if the determining unit 82 permits password reset for the account. As yet another example, if the account satisfies the preset condition, password reset for the account is allowed. For example, the preset condition includes the account having a high level of safety, the account bearing a low balance, or the goods corresponding to the request operation instruction being received.

According to another embodiment, the first processing unit 84 is configured to process the request operation instruction when the authentication by the first authenticating unit 83 is successful. For example, as identity information can hardly be stolen, the first processing unit 84 can confirm that the account information is safe according to the identity information when the authentication is successful, and then the request operation instruction can be processed. In another example, as the account password is not required to process the request operation instruction, the request operation instruction can still be processed even when the user loses the password. In yet another example, the first sending unit 85 is configured to send a password reset prompt to the user terminal. In yet another example, a webpage for setup of password is sent to the user terminal, hence allowing the user to set the password on the webpage via the user terminal. In yet another example, a message that requests to return password information is sent to the user terminal, hence allowing the user to return the password information via the user terminal when the user sees the message.

According to yet another embodiment, the second receiving unit 86 is configured to receive password information returned by the user terminal, where the password information is set by a user in response to the password reset prompt after the user terminal receives the password reset prompt. For example, once receiving the password reset prompt, the user terminal can display the password reset prompt so that the user can set the password on the user terminal and the user terminal can return the password information. In another example, the password information includes a password or a password rule.

According to yet another embodiment, the second sending unit 87 is configured to send to a server a password reset request that carries the password information so that the server responds to the password reset request and sets a new password for the account according to the password information. For example, once receiving the password information, the second sending unit 87 can send to the server the password reset request so as to request the server to reset the password of the account. In another example, the password reset request includes the account information and/or the identity information.

Figure 9:
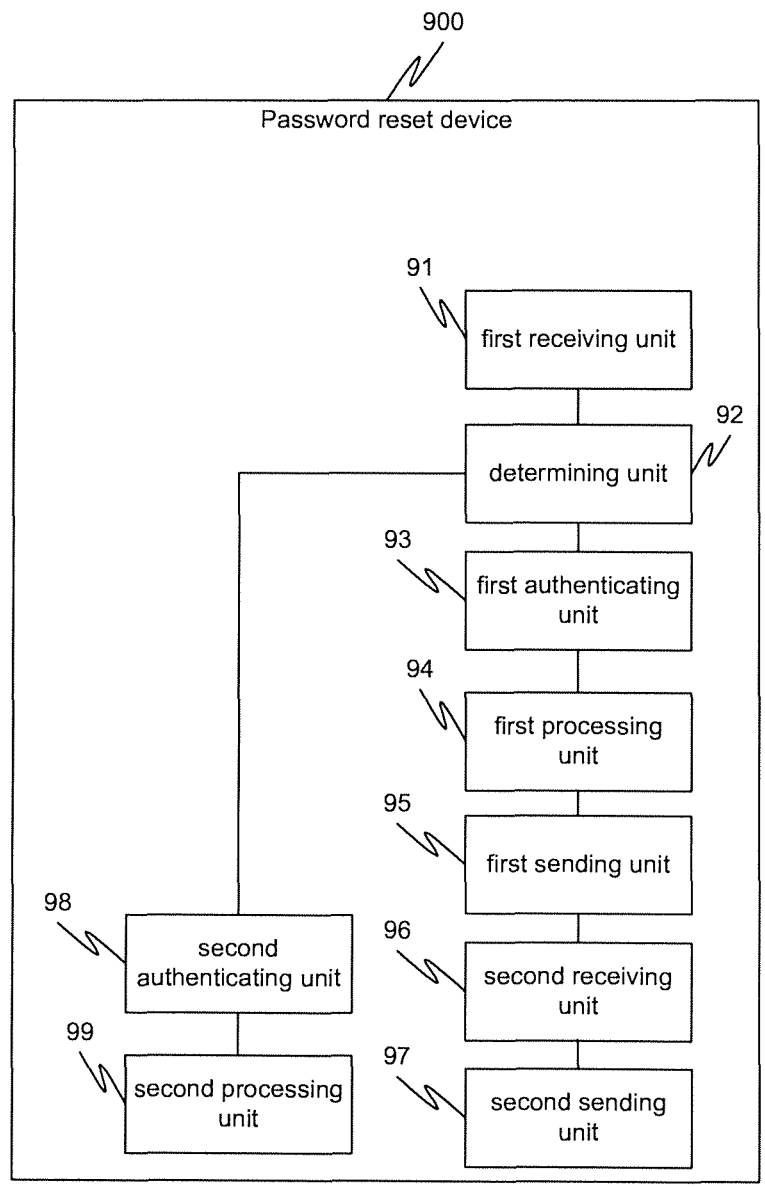
FIG. 9 is a simplified diagram showing a device for password reset according to another embodiment of the present invention.

FIG. 9 is a simplified diagram showing a device for password reset according to another embodiment of the present invention. The diagram is merely an example, which should not unduly limit the scope of the claims. One of ordinary skill in the art would recognize many variations, alternatives, and modifications. The device 900 includes a first receiving unit 91, a determining unit 92, a first authenticating unit 93, a first processing unit 94, a first sending unit 95, a second receiving unit 96, a second sending unit 97, a second authenticating unit 98 and a second processing unit 99.

According to one embodiment, the first receiving unit 91 is configured to receive a request operation instruction from a user terminal, where the request operation instruction includes account information and identity information. For example, the determining unit 92 is configured to determine whether the account indicated by the account information satisfies a preset condition. For example, if the account satisfies a preset condition, the password reset for the account is permitted. Otherwise, the password reset for the account is forbidden. The preset condition is flexibly set. For example, the preset condition includes the balance being less than a specific amount, the safety level being higher than a specific safety level, the goods corresponding to the request operation instruction being received, or limited losses from theft of the password. In another example, when password reset for the account is permitted, a mark indicating that password reset for the account information is permitted is generated so that the subsequent process of password reset can recognize via the mark that password reset for this account is permitted.

According to another embodiment, the first authenticating unit 93 is configured to authenticate the account information and the identity information if the determining unit 92 permits password reset for the account. For example, the first authenticating unit 93 is configured to send an authentication request to the server, where the authentication request includes the account information and the identity information, so that the server authenticates the association between the account information and the identity information; and receive an authentication pass message from the server. In another example, the server manages the password of the account indicated by the account information and therefore the server can save the identity information, such as the identity information associated with the account information. In yet another example, when the server receives the account information and the identity information, the server can authenticate the associations. In yet another example, the server can authenticate if the account information and the identity information received are associated. If the account information and the identity information are associated, the authentication is successful, and if the account information and the identity information are not associated, the authentication fails, according to certain embodiments. For example, the server can judge if the identity information received conforms to the pre-stored identity information that is associated with the account information. If the identity information conforms to the pre-stored identity information, the authentication is successful. Otherwise, the authentication fails. In another example, if the authentication is successful, the account is safe and the first processing unit 94 can process the request operation instruction. If the authentication fails, the account is unsafe and the device 900 may refuse to process the request operation instruction.

According to yet another embodiment, the first processing unit 94 is configured to process the request operation instruction when the authentication by the first authenticating unit 93 is successful. For example, the processing unit 94 is configured to send to a designated communication account verification request that requests to return verification information, where the communication account is associated with the account information, receive the verification information returned by the communication account and process the request operation instruction according to the verification information. As an example, once the authentication is successful, the processing unit 94 can perform verification via the communication account in order to improve the safety of payment. As another example, the communication account includes a cell phone number, an email address and an instant messaging account. In another example, the device 900 acquires the communication account in advance or receive the communication account transmitted by the user terminal.

In one embodiment, the first sending unit 95 is configured to send a password reset prompt to the user terminal. For example, the first sending unit 95 can send a password reset prompt to the user terminal after the processing of the first processor 94 occurs. In another example, the second receiving unit 96 is configured to receive password information returned by the user terminal, where the password information is set by a user in response to the password reset prompt after the user terminal receives the password reset prompt. In yet another example, the second sending unit 97 is configured to send to a server a password reset request that carries the password information so that the server responds to the password reset request and sets a new password for the account according to the password information.

In some embodiments, the password reset request includes the account information and/or the identity information. In yet another example, a password reset credential is generated according to the account information and the identity information, and then the password reset credential is sent to the server via the password reset request. As an example, the account information and the identity information are combined into a password reset credential. As another example, the password reset credential is generated through specific computation of the account information and the identity information. The server can acquire the account information and the identity information via the password reset credential, hence completing the password reset of the account, in some embodiments.

Figure 10:
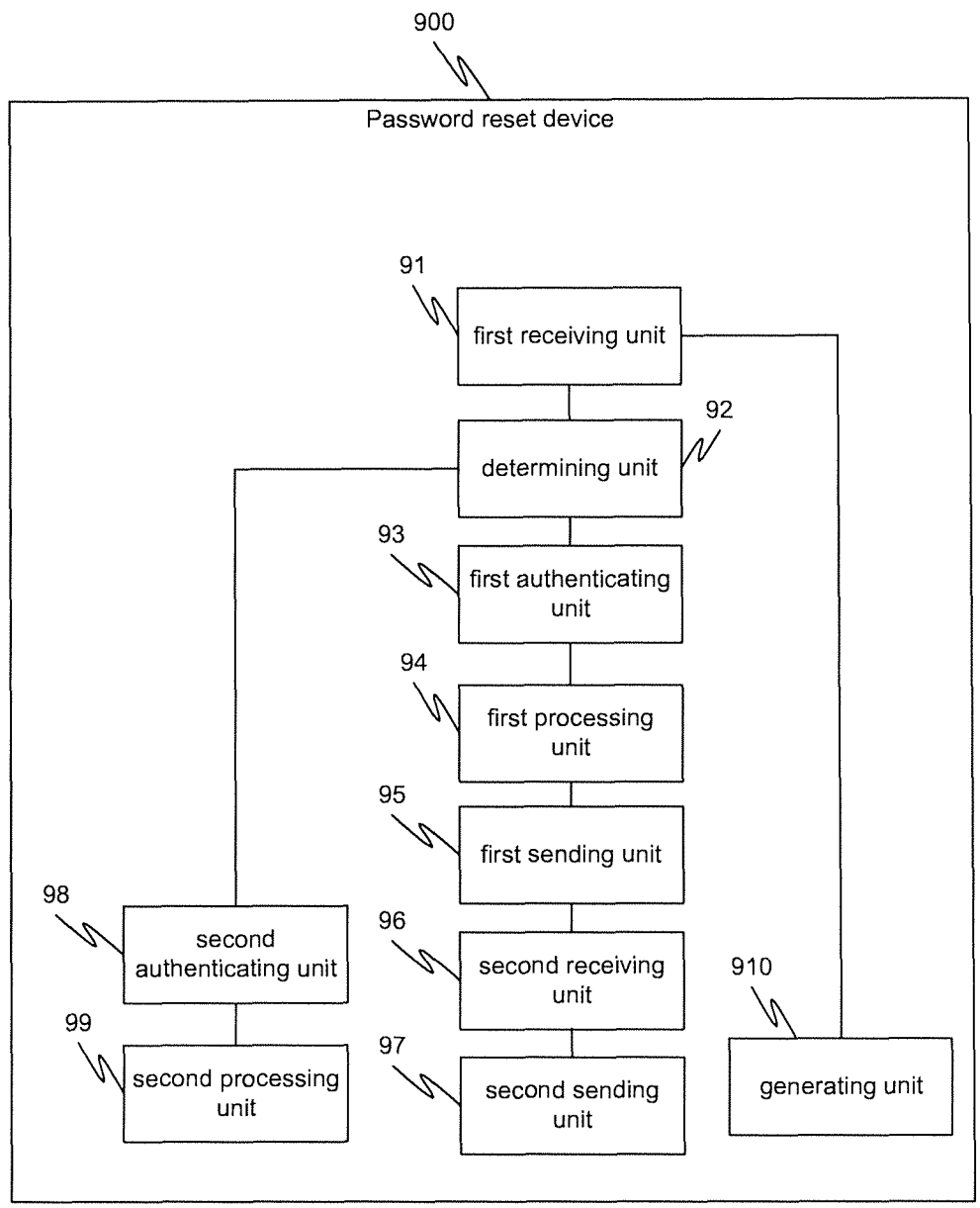
FIG. 10 is a simplified diagram showing a device for password reset according to yet another embodiment of the present invention.

FIG. 10 is a simplified diagram showing a device for password reset according to yet another embodiment of the present invention. The diagram is merely an example, which should not unduly limit the scope of the claims. One of ordinary skill in the art would recognize many variations, alternatives, and modifications. The device 900 further includes a generating unit 910.

According to one embodiment, the generating unit 910 is configured to generate a password reset credential according to the account information and the identity information. For example, the second sending unit 97 is configured to send to the server a password reset request, where the password reset request includes the password information and the password reset credential, so that the server sets a new password for the account according to the password reset credential and the password information. The safety of payment password is improved as the server needs to pass the password reset credential before the password of the account can be reset, in some embodiments.

According to another embodiment, a second authenticating unit 98 is configured to authenticate the account information and the identity information if the determining unit 92 forbids password reset for the account. For example, a second processing unit 99 is configured to process the request operation instruction when the authentication by the second authenticating unit 98 is successful. As an example, through the second authenticating unit 98 and the second processing unit 99, the request operation instruction can be processed according to the account information and the identity information when account password reset is forbidden. This enables processing of a request operation instruction even when password reset is forbidden, hence avoiding cancellation of processing of the request operation instruction when password reset is forbidden, in some embodiments.

According to yet another embodiment, the second authenticating unit 98 is configured to send an authentication request to the server when the determining unit 92 forbids password reset for the account, where the authentication request includes the account information and the identity information, so that the server authenticates the association between the account information and the identity information. For example, the second authenticating unit 98 is further configured to receive an authentication pass message from the server. As the request operation instruction can be processed only after verification is successful in this embodiment, the safety of processing of the request operation instruction is hence improved, according to certain embodiments.

In one embodiment, the second processing unit 99 sends to a designated communication account verification request that requests to return verification information, where the communication account is associated with the account, and receives the verification information returned by the communication account and processes the request operation instruction according to the verification information. For example, communication account is further verified after authentication of account information and identity information is successful, hence improving the safety of processing of the request operation instruction. As an example, the second authenticating unit 98 is further configured to authenticate the account information and the identity information when the determining unit 92 forbids password reset for the account and the amount of payment requested by the request operation instruction does not exceed a preset threshold. The account information and the identity information are authenticated when the amount of payment requested by the request operation instruction does not exceed a preset threshold, according to certain embodiments. That is, the request operation instruction can be processed only when the amount of payment requested by the request operation instruction does not exceed the preset threshold. This improves the safety of payment because only payment of small amount is permitted when password reset for the account is forbidden, in some embodiments.

Figure 11:
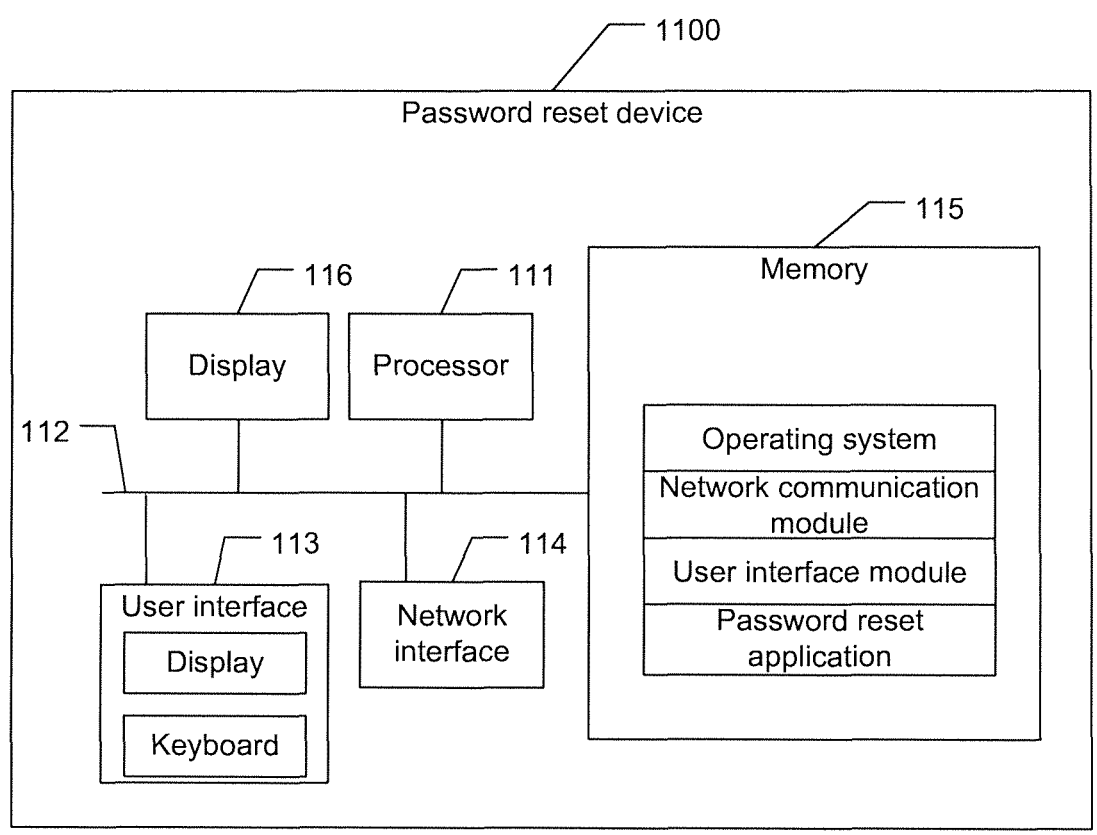
FIG. 11 is a simplified diagram showing a device for password reset according to yet another embodiment of the present invention.

FIG. 11 is a simplified diagram showing a device for password reset according to yet another embodiment of the present invention. The diagram is merely an example, which should not unduly limit the scope of the claims. One of ordinary skill in the art would recognize many variations, alternatives, and modifications. The device 1100 includes a processor 111 (e.g., a CPU), a network interface 114, a user interface 113, a memory 115 and a communication bus 112.

According to one embodiment, the communication bus 112 is configured for the connection and communication among these components. For example, the user interface 113 includes a display and a keyboard. In another example, the user interface 113 also includes a standard wired interface and a wireless interface. In yet another example, the network interface 114 includes a standard wired interface and a wireless interface (e.g., a Wi-Fi interface). As an example, the memory 115 includes high-speed RAM memory or non-volatile memory (e.g. a magnetic disk memory). As another example, the memory 115 includes a memory installed far away from the foregoing processor 111. As shown in FIG. 11, the memory 115, as a computer storage medium, includes an operating system, a network communication module, a user interface module and password reset application.

According to another embodiment, the network interface 114 is configured to connect a user terminal and a server for data communication. For example, the processor 111 is configured to call the password reset application stored in the memory 115 and perform certain operations. As an example, the operations include: receiving a request operation instruction from a user terminal via the network interface 114, where the request operation instruction includes account information and identity information; determining whether to permit password reset for an account indicated by the account information; authenticating the account information and the identity information if password reset for the account is permitted; processing the request operation instruction when the authentication is successful; sending a password reset prompt to the user terminal via the network interface 114; receiving password information returned by the user terminal via the network interface 114, where the password information is set by a user in response to the password reset prompt after the user terminal receives the password reset prompt; and via the network interface 114, sending to a server a password reset request that carries the password information so that the server responds to the password reset request and sets a new password for the account according to the password information.

According to yet another embodiment, the identity information is recorded upon registration of the account as indicated by the account information, e.g., an ID card number, address information, age information and family information. For example, password reset for the account is allowed if the account satisfies the preset condition, e.g., the account information having a high level of safety, the account information indicating a low balance, or the goods corresponding to the request operation instruction being received. As an example, a webpage for setup of password is sent to the user terminal, hence allowing the user to set the password on the webpage via the user terminal. In yet another example, a message that requests to return password information is sent to the user terminal, hence allowing the user to return the password information via the user terminal when the user sees the message. For example, once receiving the password information, the processor 111 can send to the server the password reset request so as to request the server to reset the password of the account. In another example, the password reset request includes the account information and/or the identity information.

In one embodiment, the processor 111 is configured to perform further operations including: authenticating the account information and the identity information if password reset for the account is forbidden; and processing the request operation instruction when the authentication is successful. The preset condition is flexibly set. For example, the preset condition includes the balance being less than a specific amount, the safety level being higher than a specific safety level, the goods corresponding to the request operation instruction being received, or losses from theft of the password. In another example, when password reset for the account is permitted, a mark indicating that password reset for the account information is permitted is generated so that the subsequent process of password reset can recognize via the mark that password reset for this account is permitted. In yet another example, the processor 111 perform certain operations for authentication of the account information and the identity information. The operations include: sending an authentication request to the server via the network interface 114, where the authentication request includes the account information and the identity information, so that the server authenticates the association between the account information and the identity information, and receiving an authentication pass message from the server via the network interface 114, according to some embodiments.

In another embodiment, the server manages the password of the account indicated by the account information and therefore the server can save the identity information, such as the identity information associated with the account information. As an example, when the server receives the account information and the identity information, the server can authenticate the associations. In yet another example, the server can authenticate if the account information and the identity information received are associated. If the account information and the identity information are associated, the authentication is successful, and if the account information and the identity information are not associated, the authentication fails, according to certain embodiments. For example, the server can judge if the identity information received conforms to the pre-stored identity information that is associated with the account information. If the identity information conforms to the pre-stored identity information, the authentication is successful. Otherwise, the authentication fails. In another example, if the authentication is successful, the account is safe and the request operation instruction is processed. If the authentication fails, the account is unsafe and the request operation instruction may not be processed.

In yet another embodiment, the processor 111 performs some operations for processing the request operation instruction. For example, the operations include: via the network interface 114, sending to a designated communication account verification request that requests to return verification information, wherein the communication account is associated with the account; and via the network interface 114 receiving the verification information returned by the communication account and processing the request operation instruction according to the verification information. Once the processor 111 receives the authentication pass message, that authentication of the account information and the identity information is successful. Further verification is performed via the communication account in order to improve the safety of payment, according to some embodiments. For example, the communication account includes a cell phone number, an email address and an instant messaging account. In another example, the device 1100 may acquire the communication account in advance or receive the communication account transmitted by the user terminal.

In some embodiments, the password reset request includes the account information and/or the identity information. For example, a password reset credential is generated according to the account information and the identity information. In another example, the password reset credential is sent to the server via the password reset request. As an example, the account information and the identity information are combined into a password reset credential. As another example, the password reset credential is generated through specific computation of the account information and the identity information. The server can acquire the account information and the identity information via the password reset credential, hence completing the password reset of the account, according to some embodiments.

In certain embodiments, the processor 111 is further configured to perform operations including: generating a password reset credential according to the account information and the identity information. For example, a password reset request is sent to the server via the network interface 114, where the password reset request includes the password information and the password reset credential, so that the server sets a new password for the account according to the password reset credential and the password information. The safety of payment password is improved as the server needs to pass the password reset credential before the password of the account can be reset, according to some embodiments. For example, an authentication request is sent to the server via the network interface 114 when password reset for the account is forbidden, where the authentication request includes the account information and the identity information, so that the server authenticates the association between the account information and the identity information. In another example, an authentication pass message is received from the server via the network interface 114. In yet another example, the account information and the identity information are authenticated if the amount of payment requested by the request operation instruction does not exceed a preset threshold. The account information and the identity information are authenticated when the amount of payment requested by the request operation instruction does not exceed a preset threshold, according to some embodiments. For example, the request operation instruction can be processed only when the amount of payment requested by the request operation instruction does not exceed the preset threshold. This improves the safety of payment because payment of small amount is permitted when password reset for the account is forbidden, according to some embodiments. The device 1100 helps to reset the password during processing of the request operation instruction, i.e. the reset of password and the processing of request operation instructions can be combined in a single process, hence increasing the efficiency of service processing, according to certain embodiments.

In certain embodiments, a request operation instruction includes an operation instruction to request for payment or transfer. For example, a request operation instruction is transmitted in the form of a webpage or a page. In another example, the request operation instruction includes the amount information, e.g. the amount of payment and the amount of receipt. In yet another example, the account information included in a request operation instruction includes the information of the paying account, e.g., text information or image information of the paying account. In yet another example, the account information further includes information of the payee account.

In some embodiments, a first server (e.g., the first server 71) is capable of processing the request operation instruction, e.g., a payment website server or a third-party payment server. For example, a second server (e.g., the second server 73) is capable of managing account passwords, e.g., a bank server or a trading server. In another example, a user terminal (e.g., the user terminal 72) is capable of communication, e.g., a tablet computer, a cell phone, an electronic reader, a remote controller, a personal computer, a laptop computer, a vehicle-mounted equipment, a network TV set, a wearable device, or any other smart device that allow access to the Internet.

According to one embodiment, a method is provided for password reset. For example, a first server receives a request operation instruction from a user terminal, wherein the request operation instruction includes account information and identity information; the first server determines whether to permit password reset for a first account indicated by the account information; in response to the password reset for the first account being permitted, the first server authenticates the account information and the identity information; in response to the authentication of the account information and the identity information being successful, the first server processes the request operation instruction and sends a password reset prompt to the user terminal; the user terminal receives the password reset prompt and sends to the first server password information set by a user in response to the password reset prompt; the first server sends to a second server a password reset request that carries the password information; the second server responds to the password reset request; and the second server sets a new password for the first account according to the password information. For example, the method is implemented according to at least FIG. 1 and/or FIG. 2.

According to another embodiment, a method is provided for password reset. A request operation instruction is received from a user terminal, wherein the request operation instruction includes account information and identity information; whether to permit password reset for a first account indicated by the account information is determined; in response to the password reset for the first account being permitted, the account information and the identity information are authenticated; in response to the authentication of the account information and the identity information being successful, the request operation instruction is processed and a password reset prompt is sent to the user terminal; password information set by the user terminal is received, wherein the password information is set by a user in response to the password reset prompt after the user terminal receives the password reset prompt; and a password reset request that carries the password information is sent to a server so that the server responds to the password reset request and sets a new password for the first account according to the password information. For example, the method is implemented according to at least FIG. 3.

According to yet another embodiment, a system for password reset includes: a first server, a user terminal and a second server. The first server is configured to: receive a request operation instruction from the user terminal, wherein the request operation instruction includes account information and identity information; determine whether to permit password reset for a first account indicated by the account information; in response to the password reset for the first account being permitted, authenticate the account information and the identity information; in response to the authentication of the account information and the identity information being successful, process the request operation instruction and send a password reset prompt to the user terminal; the user terminal is configured to receive the password reset prompt and send to the first server password information set by a user in response to the password reset prompt; the first server is further configured to send to the second server a password reset request that carries the password information; and the second server is configured to respond to the password reset request and set a new password for the first account according to the password information. For example, the system is implemented according to at least FIG. 7.

In one embodiment, a device for password reset includes: a first receiving unit; a determining unit; a first authenticating unit; a first processing unit; a first sending unit; a second receiving unit; and a second sending unit. The first receiving unit is configured to receive a request operation instruction from the user terminal, wherein the request operation instruction includes account information and identity information. The determining unit is configured to determine whether to permit password reset for a first account indicated by the account information. The first authenticating unit is configured to, in response to the password reset for the first account being permitted, authenticate the account information and the identity information. The first processing unit is configured to in response to the authentication of the account information and the identity information being successful, process the request operation instruction. The first sending unit is configured to send a password reset prompt to the user terminal. The second receiving unit is configured to receive password information set by the user terminal, wherein the password information is set by a user in response to the password reset prompt after the user terminal receives the password reset prompt. The second sending unit is configured to send to a server a password reset request that carries the password information so that the server responds to the password reset request and sets a new password for the first account according to the password information. For example, the device is implemented according to at least FIG. 8, FIG. 9, and/or FIG. 10.

In another embodiment, a non-transitory computer readable storage medium includes programming instructions for password reset. The programming instructions are configured to cause one or more data processors to execute certain operations. For example, a request operation instruction is received from a user terminal, wherein the request operation instruction includes account information and identity information; whether to permit password reset for a first account indicated by the account information is determined; in response to the password reset for the first account being permitted, the account information and the identity information are authenticated; in response to the authentication of the account information and the identity information being successful, the request operation instruction is processed and a password reset prompt is sent to the user terminal; password information set by the user terminal is received, wherein the password information is set by a user in response to the password reset prompt after the user terminal receives the password reset prompt; and a password reset request that carries the password information is sent to a server so that the server responds to the password reset request and sets a new password for the first account according to the password information. For example, the storage medium is implemented according to at least FIG. 3.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it is understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method operating a data processing system including a user terminal and two or more servers each comprising one or more non-transitory machine-readable storage media for password reset, the method comprising:

receiving, by a first server comprising one or more non-transitory machine-readable storage media, a request operation instruction from a user terminal, wherein the request operation instruction is associated with a payment and includes account information of an account and identity information;

determining, by the first server in response to receiving the request operation instruction, whether to permit password reset for the account indicated by the account information;

in response to the password reset for the first account being permitted, authenticating, by the first server, the account information and the identity information based on determining whether the identity information matches pre-stored identity information associated with the account;

in response to the authentication of the account information and the identity information being successful,
  processing, by the first server, the request operation instruction, wherein processing the request operation instruction comprises sending, by the first server, a password reset prompt to the user terminal;

receiving, by the first server, password information set by the user terminal in response to the password reset prompt after the user terminal receives the password reset prompt;

sending, by the first server, to a second server comprising one or more non-transitory machine-readable storage media, a password reset request that carries the password information so that the second server responds to the password reset request and sets a new password for the account according to the password information;

in response to the password reset for the account being forbidden, authenticating, by the first server, the account information and the identity information; and in response to the authentication of the account information and the identity information being successful, performing the processing, by the first server, of the request operation instruction.

2. The method of claim 1, wherein the authenticating the account information and the identity information includes:
   sending, by the first server, an authentication request including the account information and the identity information to the second server so that the second server authenticates an association between the account information and the identity information; and
   receiving, by the first server, an authentication pass message from the second server.

3. The method of claim 1, wherein the processing the request operation instruction includes:
   sending, by the first server, to a designated communication account a verification request for returning verification information, wherein the communication account is associated with the account; and
   receiving, by the first server, the verification information returned by the communication account,
   wherein the processing, by the first server, of the request operation instruction is performed according to the verification information.

4. The method of claim 1, further comprising:
   generating, by the first server, a password reset credential according to the account information and the identity information;
   wherein:
     the password reset request includes the password information and the password reset credential; and
     the second server sets a new password for the account according to the password reset credential and the password information.

5. The method of claim 1, wherein the determining whether to permit password reset for the account indicated by the account information includes:
   determining, by the first server, whether the account indicated by the account information satisfies a preset condition;
   in response to the account satisfying the preset condition, permitting, by the first server, the password reset for the account; and
   in response to the first account not satisfying the preset condition, forbidding, by the first server, the password reset for the account.

6. A non-transitory computer readable storage medium comprising programming instructions for password reset, the programming instructions configured to cause a first server comprising one or more data microprocessors to execute operations comprising:
   receiving, by the first server, a request operation instruction from a user terminal, wherein the request operation instruction is associated with a payment and includes account information of an account and identity information;
   determining, by the first server in response to receiving the request operation instruction, whether to permit password reset for the account indicated by the account information;
   in response to the password reset for the first account being permitted, authenticating, by the first server, the account information and the identity information based on determining whether the identity information matches pre-stored identity information;
   in response to the authentication of the account information and the identity information being successful, processing, by the first server, the request operation instruction, wherein processing the request operation instruction comprises sending, by the first server, a password reset prompt to the user terminal;
   receiving, by the first server, password information set by the user terminal in response to the password reset prompt after the user terminal receives the password reset prompt;
   sending, by the first server, to a second server comprising one or more non-transitory machine-readable storage media, a password reset request that carries the password information so that the second server responds to the password reset request and sets a new password for the account according to the password information;
   in response to the password reset for the account being forbidden, authenticating, by the first server, the account information and the identity information; and
   in response to the authentication of the account information and the identity information being successful, performing the processing, by the first server, of the request operation instruction.

7. A system for password reset, comprising:
a first server comprising one or more data microprocessors; and
one or more non-transitory computer-readable storage media encoded with instructions for commanding the one or more data microprocessors of the first server to execute operations including:
   receiving, by the first server, a request operation instruction from a user terminal, wherein the request operation instruction is associated with a payment and includes account information of an account and identity information;
   determining, by the first server in response to receiving the request operation instruction, whether to permit password reset for the account indicated by the account information;
   in response to the password reset for the account being permitted, authenticating, by the first server, the account information and the identity information based on determining whether the identity information matches pre-stored identity information associated with the first account;
   in response to the authentication of the account information and the identity information being successful,
     processing, by the first server, the request operation instruction, wherein processing the request operation instruction comprises sending, by the first server, a password reset prompt to the user terminal;
   receiving password information set by the user terminal in response to the password reset prompt after the user terminal receives the password reset prompt; and
   sending to a second server a password reset request that carries the password information so that the server responds to the password reset request and sets a new password for the account according to the password information;
   in response to the password reset for the account being forbidden, authenticating, by the first server, the account information and the identity information; and
   in response to the authentication of the account information and the identity information being successful, performing the processing, by the first server, of the request operation instruction.

* * * * *